United States Patent [19]

Ek et al.

[11] Patent Number: 4,549,970
[45] Date of Patent: Oct. 29, 1985

[54] METHOD FOR COLLECTING AND SEPARATING SOLIDS AND/OR INSOLUBLE LIQUIDS FROM A LIQUID BODY

[76] Inventors: Kenneth Ek, Pl. 6148 Hagby, 388 00 Ljungbyholm; Ulf Hammarstedt, Traktörsgränd 6, 393 64, Kalmar, both of Sweden

[21] Appl. No.: 507,622

[22] Filed: Jun. 24, 1983

[51] Int. Cl.⁴ .............................................. E02B 15/04
[52] U.S. Cl. .................................... 210/776; 210/784; 210/923
[58] Field of Search ................. 210/150, 242.1, 242.3, 210/512.1, 776, 780, 784, 787, 923

[56] References Cited

U.S. PATENT DOCUMENTS

| | | | |
|---|---|---|---|
| 2,586,692 | 2/1952 | Morel | 210/150 |
| 3,426,902 | 2/1969 | Kilpert et al. | 210/923 |
| 3,576,257 | 4/1971 | Yates | 210/242.3 |
| 3,865,730 | 2/1975 | Ayers et al. | 210/242.3 |
| 4,085,049 | 4/1978 | Hartwick et al. | 210/923 |
| 4,391,707 | 7/1983 | Gordon | 210/242.3 |

Primary Examiner—Thomas Wyse
Attorney, Agent, or Firm—Beveridge, DeGrandi & Weilacher

[57] ABSTRACT

Solids or insoluble liquids are removed from a liquid body by a partially immersed collector wheel which rotates about a horizontal axis and comprises a mesh sheet bent into a spiral shape. The sheet is formed of expanded metal to create contaminant-free turbulent zones adjacent to the sheet during rotation of the wheel. A receptacle with an upper opening is located within the collector wheel, in a position where it will receive the contaminants carried thereto by the trailing portion of the spiral mesh sheet. A screw in the receptacle discharges the contaminants to a discharge tube.

6 Claims, 4 Drawing Figures

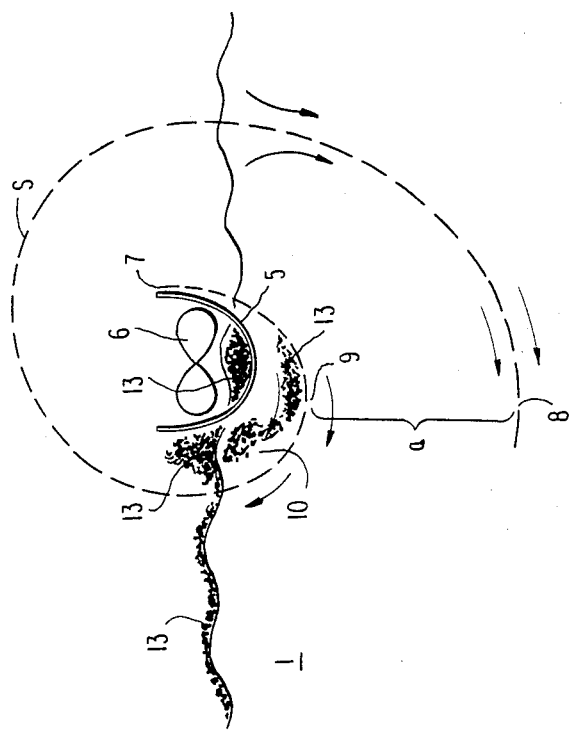
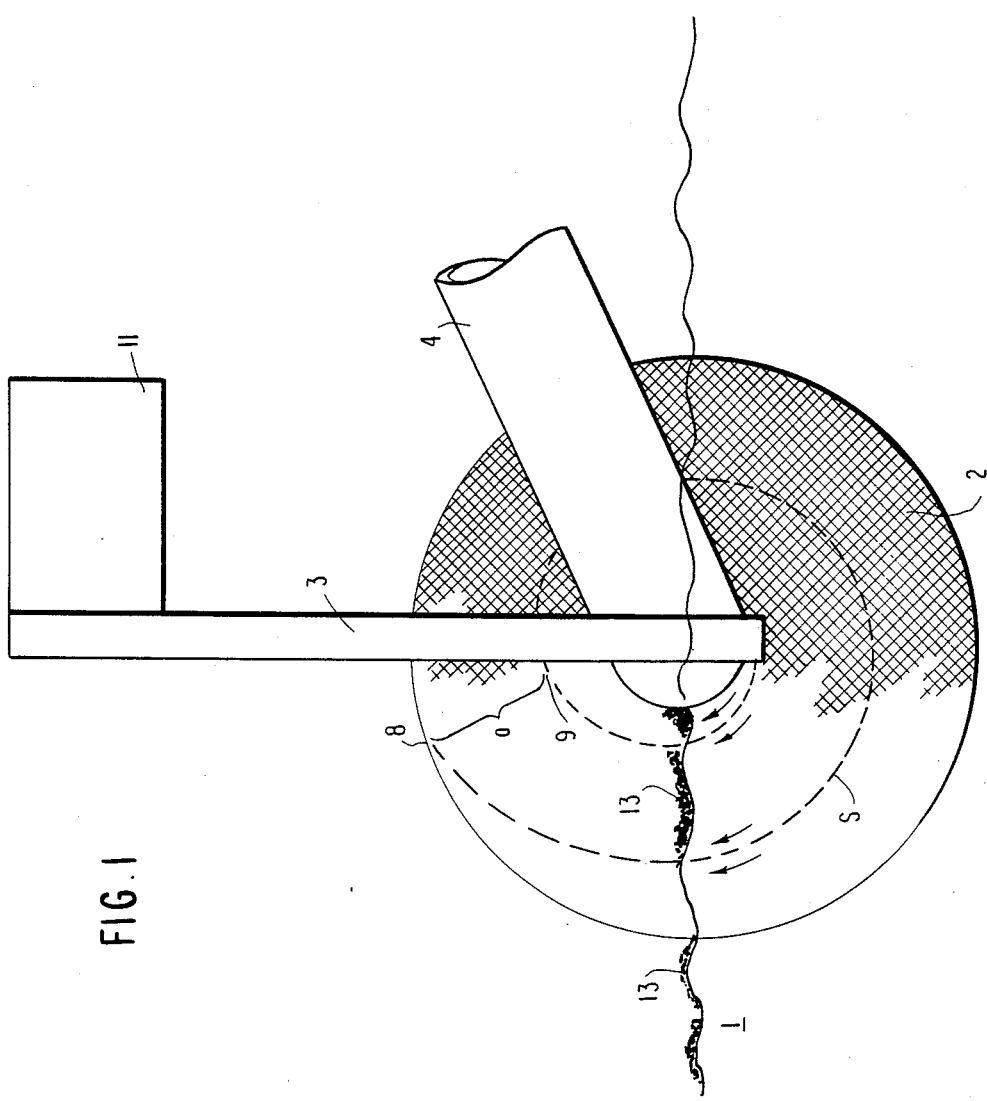

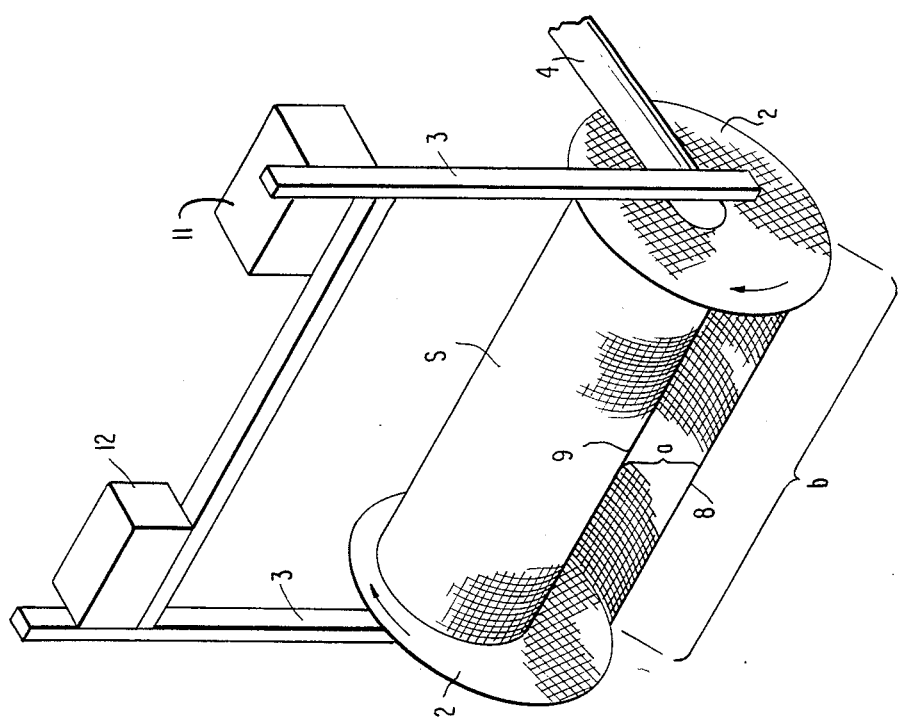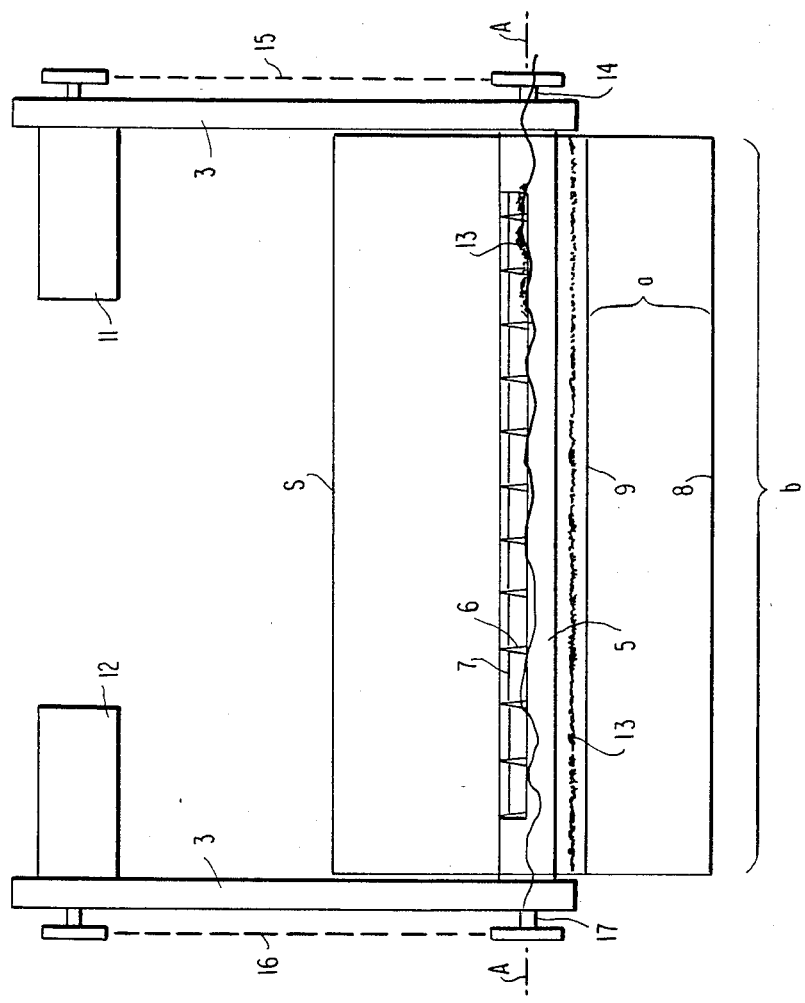

METHOD FOR COLLECTING AND SEPARATING SOLIDS AND/OR INSOLUBLE LIQUIDS FROM A LIQUID BODY

BACKGROUND OF THE INVENTION

The present invention relates to a method and apparatus for mechanically removing solids and/or insoluble liquids from a liquid body. The invention relates more specifically to the construction and use of a collector wheel which is operable to collect and remove oil at sea and in beach areas, to decontaminate liquid bodies contaminated with undissolved chemicals, to treat waste water, to be used as a dredger or as a supplement to it, or to be used for fishing for shrimps, etc.

The principal object of the present invention is to remedy the deficiencies of the existing devices for oil separation and removal, by improving the efficiency, increasing the speed of the oil separation process and lowering the energy consumption. A second object of the invention is to avoid damage to the environment caused by the separation and removal process. A third object of the invention is to lessen the dependence of the separation and removal process on weather conditions such as wind, wave movements, temperature, and on the spreading of the contaminating material on the surface of and down into the liquid body.

SUMMARY OF THE INVENTION

According to the present invention, the three objects mentioned above are achieved satisfactorily by means of a rotating collector wheel formed primarily of mesh material. The collector wheel is placed in a body of water contaminated with oil or any water insoluble material. Upon rotation, the wheel entraps water and oil, separates the oil from the water and removes the separated oil to a collecting vessel.

The collector wheel is supported for rotation about an axis and it comprises a sheet of mesh material having openings therein. This sheet is spaced from the axis by distances which decrease progressively from its leading edge to its trailing edge so that the axis is closer to the trailing edge than to the leading edge. Opposed end panels are located at the side edges of the sheet. The wheel is rotated about its axis in a direction toward the leading edge, causing the movement of materials therewithin toward a receptacle which is located on the wheel axis and has an upwardly facing opening. The trailing edge of the sheet wipes the exterior surface of the receptacle during rotation of the collector wheel so that materials are deposited in the receptacle. Within the receptacle, rotating means are provided for discharging the collected material.

Preferably, the end panels of the collector wheel are formed of mesh material and are connected to the side edges of the sheet for concurrent rotation therewith. The mesh material is a sheet of expanded metal formed of stainless steel, with the openings therein being substantially square and having been formed by cutting small slits in the sheet and subsequently elongating the sheet. These openings have edges which have a length of about 0.5 to 10 mm. The wheel is rotated at a speed of between 1 and 100 revolutions per minute. The collector wheel is supported on a shaft connected to a support frame which is positioned so that the rotational axis of the collector wheel is approximately at the surface of the liquid body.

BRIEF DESCRIPTION OF THE DRAWINGS

The present invention is described in more detail in the following text, reference being made to the enclosed partly schematic drawings, wherein FIG. 1 is a partially broken side view of a preferred embodiment of the collector wheel;

FIG. 2 is a diagrammatic sectional side view taken along a line perpendicular to the axis of the collector wheel;

FIG. 3 is a partially sectioned front view of the collector wheel, with portions of the mesh material being removed to expose the centrally located receptacle and screw; and FIG. 4 is a perspective view of the collector wheel.

DESCRIPTION OF A PREFERRED EMBODIMENT

Referring to the drawings, FIGS. 1–4 show the construction and operation of the collector wheel of the preferred embodiment of this invention. It is partially immersed into a body of water 1 which is contaminated with oil 13. The wheel comprises a spiral shaped sheet S, the sides of which are connected to and supported by two opposed end panels 2. The sheet S and end panels 2 are all made of a metal or plastic mesh material, i.e. a sheet having holes in it. Only portions of the mesh material of end panels 2 are shown in FIG. 1 in order to show more clearly the spiral shaped mesh sheet S. The mesh material is preferably expanded metal which is produced by cutting a plurality of small parallel slits in a sheet of stainless steel, and subsequently drawing out the sheet in order to enlarge the slits into small substantially square openings. These openings preferably have edges which are about 0.5 to 10 mm in length. The expanded metal sheet has a plurality of interconnected strips or webs which are inclined relative to the plane of the sheet in order to promote turbulence in the water during rotation of the collector wheel.

The collector wheel is rotatably supported on a shaft which comprises a pair of stub shaft sections rigidly connected to the end panels 2. One stub shaft is shown at 14 in FIG. 3. These stub shafts are rotatably supported in bearings on a pair of vertical frame members 3 so that the collector is rotatable about a substantially horizontal axis A shown in FIG. 3. The frame also supports a hydraulic motor 11 which, through a belt or chain shown diagrammatically at 15 in FIG. 3, rotates the shaft 14 and the collector wheel about the axis A.

Rotation of the collector wheel will produce movement of any oil therewithin toward the axis A. To remove this oil from the collector wheel, the apparatus is provided with an axially oriented enclosure or receptacle 5 which has an upwardly facing opening and extends between the central portions of the two end panels 2. This receptacle is firmly mounted on one of the frame members 3 in order to remain upright during operation of the apparatus. Oil which arrives in the receptacle 5 is propelled by a rotating means such as a screw 6 which is coaxial with the collector wheel shaft 14 and axis A. Screw 6 carries the oil to a discharge tube 4 which then carries the oil to a collecting vessel. FIG. 3 shows a motor 12 which drives the oil propelling screw 6. This driving connection is made, for example, by a belt or chain represented by the broken line 16 in FIG. 3. The frame portions which carry motors 11 and 12 their transmissions are only shown schematically in the drawings.

The spiral shaped metal mesh sheet S shown in FIGS. 1-4 has a leading edge 7 and a trailing edge 8 which are parallel to the axis A. The configuration of the sheet provides an opening which is located in the collector wheel between the leading edge 8 and a line 9 in the mesh parallel to it. This opening is located in a plane which extends through the axis A, and it has a breadth a. This plane is vertically disposed in FIGS. 2-4. The collector wheel rotates in the direction indicated by the arrows in FIG. 2. After rotating 90° beyond the illustrated position, the collector wheel picks up oil 13 on the water in a surface area a x b, i.e. the breadth of the opening times the length of the wheel. During this 90° rotation, and further within the confines of the collector wheel, the volume 10 defined by the metal mesh and the water surface decreases sharply so that a major portion of the oil in that space is delivered into the receptacle 5. This oil is forwarded by screw 6 to the discharge tube 4. Due to upwardly moving turbulent streams created by the movement of the metal mesh in the water, newly collected oil 13 is retained within the wheel in a water surface area which is diminishing between two convolutions of the mesh. Oil collected earlier, farther inside the wheel in volume 10, is kept in place in the same manner.

In the course of operation of the apparatus, the rotational speed of the wheel can vary considerably depending upon the thickness of the oil layer, the forward speed of the wheel frame in relation to a body of water, wheel dimensions such as length and diameter, weather conditions etc. Preferably it is 1-100 revolutions per minute. Certain amounts of oil are collected in the collector wheel opening each time the opening reaches the oil layer in the body of water. The water becomes turbulent close to the mesh material, creating zones substantially free from oil on each side of the mesh material and preventing the collected oil from escaping from the interior of the wheel. This turbulence also keeps the mesh material reasonably clean. Due to the spiral shape of the sheet S of mesh material and the water turbulence at the walls of the sheets, the collected oil moves radially inwardly toward the receptacle 5 until it is carried to the opening of the receptacle 5 by the wiping action of the trailing edge 8 of the sheet S on the cylindrically shaped surface of the enclosure.

The collector wheel, receptacle 5 and screw 6 may be supported on the frame by means of concentric shafts. For example, three concentric shafts may be located at the left end of the wheel as seen in FIG. 3. The innermost shaft, shown at 17 in FIG. 3 is rigidly connected to the screw 6 and is driven by the belt 16. The intermediate shaft is rigidly affixed to the frame 3 and the receptacle 5 to keep the receptacle 5 in an upright orientation; and, the outer shaft is the collector wheel stub shaft, rotatably supported in bearings on the frame to permit rotation of the collector wheel. The right end of the receptacle 5 may be provided with a hollow shaft which is connected by a rotary conduit coupling to the discharge tube 4 and rotates coaxially within the stub shaft 14.

The shaft and axis of the collector wheel can be positioned above, at and below the liquid surface of the body of water. Adjustments in the elevation may be made by hydraulic cylinders which are connected to the frame members 3.

Although the foregoing description has related primarily to the removal of floating layers of oil from a body of water, the invention may be used for the removal of emulsified oils having a large water content, spilled oil which is sinking, pulverous chemicals, raw sewage, impurities in liquids in dredging operations, or marine life such as shrimp.

The frame 3 of the device will be supported in most instances by a floating support such as a boat, barge or raft. In cases where it is used in the shallow waters of beach areas, it may be mounted on a truck or motor vehicle provided with caterpillar treads.

Persons familiar with the field of the invention will readily recognize that it may take many forms other than the preferred embodiment disclosed in this specification. Therefore, it is emphasized that the invention is not limited to this embodiment but is embracing of many modifications and variations which fall within the spirit of the following claims.

We claim:

1. A method of mechanically collecting and separating solids and/or insoluble liquids from a liquid body by the use of a collector wheel which is supported for rotation about an axis, said collector wheel being located in said liquid body and comprising a sheet of mesh material having openings therein, said sheet having a leading edge, a trailing edge and opposed side edges, said sheet being spaced from said axis by distances which decrease progressively from said leading edge to said trailing edge so that the axis is closer to the trailing edge than to the leading edge, opposed end panels located at the side edges of said sheet, a receptacle located on said axis and having an upwardly facing opening, said receptacle having an exterior surface which is wiped by said trailing edge of the sheet during rotation of the collector wheel, and means for discharging material which is collected in the receptacle, said method being performed by rotating said collector wheel in said liquid body about said axis in a direction toward said leading edge to collect said solids or insoluble liquids in said body, said rotation of the collector wheel creating a turbulent zone near the mesh to prevent solids or insoluble liquids from escaping from the interior of the wheel.

2. A method according to claim 1 wherein said end panels are formed of mesh material and are connected to the sheet for concurrent rotation therewith.

3. A method according to claim 1 wherein the collector wheel is rotated at a speed of between 1 and 100 revolutions per minute.

4. A method according to claim 1 wherein said collector wheel is supported at a position where said axis is approximately at the surface of said liquid body.

5. A method according to claim 1 wherein said sheet is a sheet of expanded metal formed of stainless steel, said openings being substantially square and having been formed by cutting small slits in the sheet and subsequently elongating the sheet.

6. A method according to claim 1 wherein the openings have edges which have a length of about 0.05 to 10 mm.

* * * * *